US011661168B2

(12) United States Patent
Dubosc (10) Patent No.: US 11,661,168 B2
(45) Date of Patent: May 30, 2023

(54) METHOD FOR OPENING/CLOSING AN AIRCRAFT DOOR AND AIRCRAFT IMPLEMENTING SUCH A METHOD (71) Applicant: LATECOERE, Toulouse Occitaine (FR)

(72) Inventor: Gregory Dubosc, Girolles Occitanie (FR)

(73) Assignee: LATECOERE, Toulouse Occitanie (FR)

( * ) Notice: Subject to any disclaimer, the term of this patent is extended or adjusted under 35 U.S.C. 154(b) by 106 days.

(21) Appl. No.: 17/283,127

(22) PCT Filed: Oct. 7, 2019

(86) PCT No.: PCT/EP2019/077098
§ 371 (c)(1),
(2) Date: Apr. 6, 2021

(87) PCT Pub. No.: WO2020/074449
PCT Pub. Date: Apr. 16, 2020

(65) Prior Publication Data
US 2021/0387713 A1 Dec. 16, 2021

(30) Foreign Application Priority Data
Oct. 10, 2018 (FR) ...................................... 1859376

(51) Int. Cl.
B64C 1/14 (2006.01)
(52) U.S. Cl.
CPC ............ B64C 1/1438 (2013.01); B64C 1/143 (2013.01)

(58) Field of Classification Search
CPC ...... B64C 1/143; B64C 1/1438; B64C 1/1423
See application file for complete search history.

(56) References Cited

U.S. PATENT DOCUMENTS

| 2,445,131 | A | * | 7/1948 | Avagim | B64C 1/1438 244/129.5 |
|---|---|---|---|---|---|
| 2,564,988 | A | | 8/1951 | Muller | |
| 2,751,636 | A | | 6/1956 | Heinemann | |
| 2,763,900 | A | | 9/1956 | Mcafee | |
| 4,854,010 | A | * | 8/1989 | Maraghe | B64C 1/1407 49/248 |
| 5,289,615 | A | * | 3/1994 | Banks | B64C 1/143 244/905 |

(Continued)

FOREIGN PATENT DOCUMENTS

| EP | 0317037 | 5/1989 |
|---|---|---|
| EP | 0741073 | 11/1996 |

(Continued)

Primary Examiner — Christopher D Hutchens
(74) Attorney, Agent, or Firm — Defillo & Associates, Inc; Evelyn A. Defillo (57) ABSTRACT A door (3) of an aircraft (1) equipped with an opening/closing mechanism, the movement which is in a main horizontal plane (P) of the aircraft (1) is controlled by coupling between the door (3) and the frame (4) on a control ramp (7) and on two front (AV) and rear (AR) guides (8,9), arranged between the respective front (AV) and rear (AR), and the frame (4) coupled to at least one handling arm (5, 6) hinged in rotation on a front side (AV) of the frame (4) and to the door (3) via a forearm (5b, 6b).

12 Claims, 6 Drawing Sheets (56) References Cited

U.S. PATENT DOCUMENTS

| | | | | |
|---|---|---|---|---|
| 5,305,969 A | * | 4/1994 | Odell | B64C 1/1407 |
| | | | | 292/259 R |
| 5,379,971 A | | 1/1995 | Kim | |
| 2002/0096602 A1 | * | 7/2002 | Dazet | B64C 1/143 |
| | | | | 244/129.5 |
| 2010/0059628 A1 | * | 3/2010 | Kobayashi | B64C 1/1438 |
| | | | | 244/129.5 |
| 2014/0103163 A1 | * | 4/2014 | Lamat | B64C 1/1461 |
| | | | | 244/129.5 |
| 2017/0158305 A1 | * | 6/2017 | Werthmann | E05D 15/54 |

FOREIGN PATENT DOCUMENTS

| | | |
|---|---|---|
| EP | 1227034 | 7/2002 |
| EP | 1558492 | 10/2007 |
| EP | 2008846 | 12/2008 |
| EP | 3321174 | 5/2018 |
| WO | WO2010001210 | 1/2010 |

* cited by examiner

METHOD FOR OPENING/CLOSING AN AIRCRAFT DOOR AND AIRCRAFT IMPLEMENTING SUCH A METHOD

CROSS REFERENCE TO RELATED APPLICATION

This application is a national stage entry of PCT/EP2019/077098 filed Oct. 7, 2019, under the International Convention and claiming priority over French Patent Application No. 1859376 filed Oct. 10, 2018.

BACKGROUND OF THE INVENTION

The invention relates to a method for opening/closing a door arranged in an aircraft fuselage opening, as well as to an aircraft equipped with a mechanism for implementing this opening method. More particularly, this invention relates to so-called "semi-plug" aircraft doors, that is to say those capable of passing through their frame when they are opened or closed.

Aircraft fuselages are generally provided with several openings allowing people or cargo to enter or exit the aircraft, which is why the aircraft doors are equipped with locking systems ensuring secure, quick and tight closing of the door in the fuselage.

Indeed, in the field of aeronautics, the locking system of a door ensures the solidity of the closing and the tightness of this door during flight. In addition, the flight crew must be able to open this door quickly and easily. The resistance to the pressure difference between the interior of the passenger compartment and the outside of the airplane is advantageously achieved by means of stops installed on the peripheries of the door and its frame.

Various aircraft door opening/closing systems exist. A first type of system consists, in opening, first in raising or lowering the door, then in applying rotational and translational movements to it to release it from its frame parallel to the latter. Another type of door opening/closing consists first in performing a first pivoting about a first virtual axis passing through the vertical median of the door then, in a second step, the door is pivoted about hinges placed along an axis coinciding with a vertical edge of the frame, resulting in a final door position with its internal part facing outward.

Basic improvements have been made to the first type of opening/closing by additions intended to facilitate the task of the flight crew: the addition of a mass compensation mechanism to this system avoids the flight crew having to lift all the weight of the door when it is opened or closed; adding a mechanism to manage the relative vertical movement between the door and an articulation arm helping to move the door; or again with the addition of a flap making it possible to prevent the formation of a vacuum between the skin of the fuselage and the skin of the door, this hole appearing during the vertical movement of the door. Regarding the second type of opening/closing, it has the drawback that the door intrudes significantly inside the cabin of the aircraft during its rotation about the first axis, which poses a problem of unavailable space and congestion in the event of an emergency evacuation.

PRIOR ART

Other improvements have been proposed for better adaptation of aircraft opening/closing systems. For example, patent document EP3321174 presents an aircraft door whose composite structure is capable of retracting, by wrinkling its surface, to allow this door, which initially covers the opening, to pass outwards so as to be positioned to the side of the frame. However, a door of this kind is awkward to use in practice.

Another document, EP0741073, presents an aid for handling an aircraft door by a hydraulic system having the advantage of cushioning the travel of the door at the end of the movement. However, such a hydraulic system is technically too complicated for such doors.

Furthermore, the document U.S. Pat. No. 2,751,636 relates to a "pluggable" cabin door equipped with levers articulated about an axis to connect a front frame part and the door and movable links to connect a door axis at its rear part and the articulation axis of the levers. These means do not make it possible to combine reliable rotational and translational movements and to avoid the door protruding significantly into the cabin.

With reference to EP0317037, an "S"-shaped rail is used to pivot an aircraft cabin door in an outward rotational movement via a lever articulated on the door and guided in the rail. This solution involves the introduction of the door into the cabin and the use of a mechanism for controlling the vertical movement of the door.

SUMMARY OF THE INVENTION

The main objective of the invention is to provide an aircraft door opening/closing kinematics and the associated mechanism which does not have the above drawbacks, in particular which is at the same time reliable, simple, easy to handle while minimizing the extent to which the door protrudes into the cabin of the aircraft, and while eliminating the movement of lifting the door. To that end, the invention provides, when the door is released, applying in a horizontal movement a movement which releases the stops on one side of the door then on the other, without the fuselage stops being prominent.

More specifically, the present invention relates to a method for opening/closing a door arranged in an opening of a fuselage of an aircraft, this opening being defined by a frame structure, the door comprising an inside face as well as front and rear parts defined with respect to a longitudinal axis of the aircraft oriented conventionally. The door and the frame of the aircraft comprise front and rear positioning stops for positioning the door in the frame. The kinematics of the movements of the door relative to the fuselage takes place from the frame in a main horizontal plane of the aircraft by at least one manipulation arm and is piloted, reversibly, by at least one guide between a closed position in abutment in the frame and an open position outside the frame on the inside face of the door against the fuselage. This method comprises the following steps, in the door opening mode:

a slide control element for opening the door guides the door to positions towards the front and towards the rear of the aircraft;

this control element generates a first movement of the door towards the rear and towards the interior of the aircraft by a combination of slide guides of the front and rear parts of the door respectively in rotation and in translation, which releases the stops of the door from the stops of the fuselage;

then, a movement of the door by rotation about the rear guide and inclined translation towards the front and outside of the aircraft along the front guide, the front part of the door and its front stops then disengaging from the frame towards the outside of the aircraft; and the arm is actuated in rotation about an articulated link on a front side of the frame in order to move the door towards the front of the aircraft, its movement ending outside the frame with the inside face of the door against the fuselage.

In the closing mode, the process for opening/closing the door, the successive stages of the opening mode are linked together in reverse kinematics.

Advantageously, return means make it possible to adapt the position of the forearm relative to the arm by extension of these return means to generate a rotational movement of the rear part of the door as well as a translation of the door towards the front of the aircraft parallel to the fuselage, the rear and front door stops then being out of the frame.

Thus, the present invention makes it possible to hold the door almost outside the cabin of the aircraft without lifting it and without causing it to enter inside the aircraft. In addition, only two mechanical guides achieve a horizontal release of the stops, which eliminates the need for a mass compensation mechanism, for a mechanism for controlling vertical movement between the door and the arm, and for a door seal flap.

The invention also relates to an aircraft comprising at least one door equipped with an opening/closing mechanism for implementing this method, a fuselage and at least one fuselage opening for inserting this door. Such a door, arranged in the fuselage opening by the frame structure, comprises an inside face and front and rear parts, defined with respect to a longitudinal axis of the aircraft oriented conventionally, the door and the frame of the aircraft comprising stops for reacting the pressure of the door in the frame. The movement of the door, in a main horizontal plane of the aircraft, is controlled by coupling between the door and the frame on a control ramp and on two slide guides, front and rear, arranged between the door parts, respectively front and rear, and the frame coupled to at least one manipulation arm articulated in rotation on a front side of the frame and to the door via a forearm.

According to advantageous features:

the control ramp and the guides each comprise a slide associated with a circulation roller in the slide, the slides of the guide being open at one end;

the slides are fixed to the frame and the rollers are integral with the door, or conversely the slides are fixed to the door and the rollers are integral with the frame;

the control ramp is arranged in the front and upper part of the door, and the front and rear guides are respectively arranged in the lower front part of the door and in the upper rear part of the door;

return means between the arm and the forearm adapt in extension the position of the forearm relative to the arm;

the control ramp and one of the guides are arranged between the arm and the door, it being possible for the rollers to be aligned on one and the same axis that is integral with the arm;

the opening/closing mechanism comprises two arms and two forearms, each arm being coupled to a forearm.

In the present text, the term "roller" denotes a part intended to move in a guide—slide, rail or the like—that is to say equally a rolling part that can move in rotation during its movement on a ramp or in a cam track, slide, track or equivalent, or a non-rotating finger that moves in translation. In addition, the expression "return means" designates any elastic element capable of exerting a return force: spring, blade, braid, cam, etc. Moreover, the terms "vertical" or "horizontal" qualify a direction parallel to the direction of terrestrial gravitation or respectively in a plane perpendicular to this direction.

Furthermore, the qualifier "longitudinal" refers to the main direction of the fuselage of the aircraft, "front" and "rear" to the conventional qualifiers of location in an aircraft, namely a plane's cockpit side and tail side. Moreover, the respectively "high" and "low" or even "upper" and "lower" positions of means—of the ends, stops, ramps or guides—refer to positions at the respectively upper and lower edge in the aircraft door, in the sense of more distant or less distant from the cabin floor. In addition, "outside" or "external" (respectively "inside" or "internal") qualifies a location located outside (respectively inside) of the aircraft cabin, in other words outside (respectively inside) the aircraft fuselage.

PRESENTATION OF THE FIGURES

Other information, features and advantages of the present invention will become apparent upon reading the following non-limited description, with reference to the appended figures which show, respectively.

DETAILED DESCRIPTION

Figure 1:
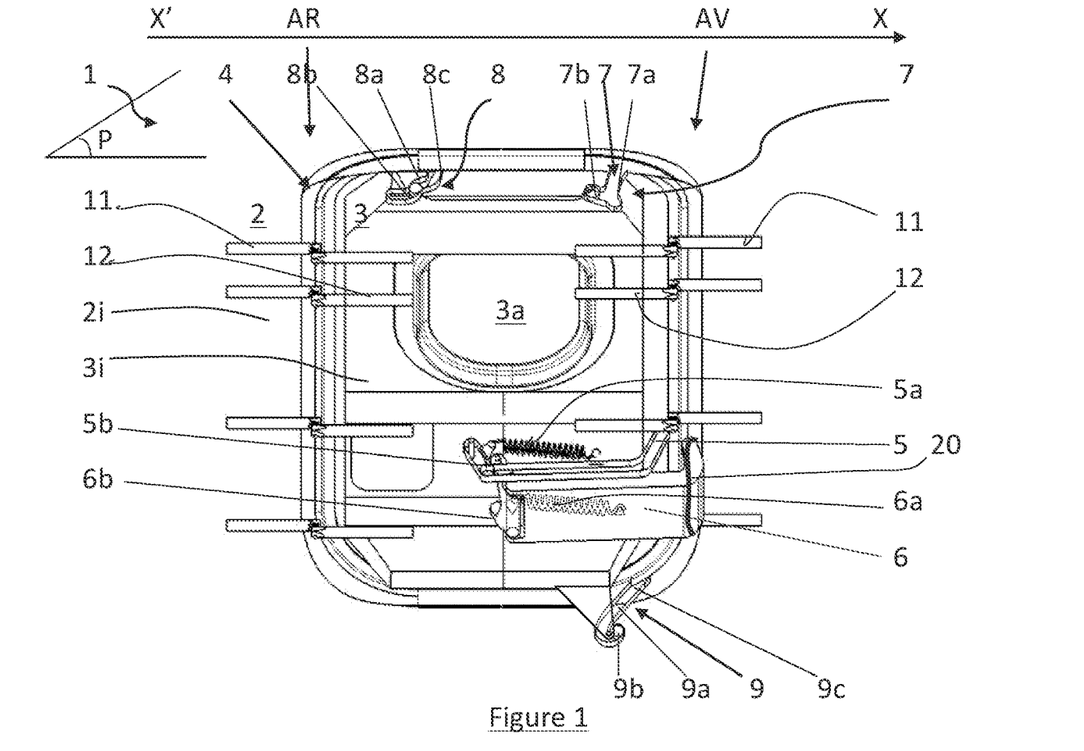
FIG. 1, a transparent face-on view of an example of a door opening/closing mechanism according to the invention in the closed position, with two front and rear guides, respectively in the low and high position of the door, and a control ramp in the high front door position.

The transparent diagram of FIG. 1 shows an inside part of an aircraft 1 with the internal face 2i of the fuselage 2 and the internal face 3i of the door 3 arranged in the fuselage frame 4 in the closed position. The longitudinal axis X'X indicates the normal direction of advance of the aircraft 1, and defines a front AV and rear AR part of the door 3. The frame 4 has several stops for reacting the pressurization forces, called retaining stops 11 (eight stops in this exemplary embodiment) serving to keep the door 3 in place in its frame 4. This door 3 also has several fixed retaining stops 12 (eight stops in this exemplary embodiment) resting on the stops 11 of the frame 4, a window 3a, and two articulation arms, a handling arm 5 and a connecting rod 6 in the example. These arms 5, 6 are mounted on an articulated connection 20 to the front side of the frame 4 in order to drive the door 3 in motion on the frame 4.

Each arm 5, 6 is coupled to a forearm 5b, 6b mounted on the door 3 via a spring 5a, 6a, fixed at the end to the respective arms 5, 6 and forearms 5b, 6b in this embodiment. The springs 5a and 6a are return means making it possible to maintain, when opening the door 3, a position of the forearms 5b and 6b relative to the arms 5 and 6 in the form of a parallelogram, the movement of these arms 5, 6 and forearms 5b, 6b in a parallelogram allowing the door 3 to remain parallel to the fuselage 2.

In order to guide the movement for releasing the stops of the door 3, a control ramp 7 comprises a slide 7a fixed on the frame 4, associated with a running roller 7b fixed on the door 3. A rear guide 8 and a front guide 9 also contribute to the movement of the door 3 according to the invention, and each comprise a slide 8a (respectively 9a) fixed on the frame 4, and a running roller 8b (respectively 9b) fixed on the door 3. The slides 8a and 9a are open at their front ends 8c and 9c.

The kinematics of opening/closing of the door 3 relative to the fuselage 2 is imparted to the door 3 from the frame 4 in a main horizontal plane "P" of the aircraft 1 by the two arms 5, 6 and the forearms 5b, 6b, and are controlled, in a reversible manner, by the two guides 8 and 9 between a closed position in abutment in the frame 4, and an open position outside the frame 4 with the inside face of the door 3 against the outer fuselage 2.

FIGS. 2a to 2d show more precisely a transparent view from above of the opening kinematics of a door 3 according to the invention. Each of these FIGS. 2a to 2d shows the two arms 5 and 6, their two forearms 5b and 6b, as well as the guides 8, 9 with their slides 8a, 9a in which the running rollers 8b, 9b move. From FIG. 2a to FIG. 2d, it can be observed that the movement of opening the door 3 is guided by the shape of the slides 8a, 9a that are integral with the fuselage 2, which drives the running rollers 8b, 9b, integral with the door, in their slides 8a, 9a.

Figure 2A:
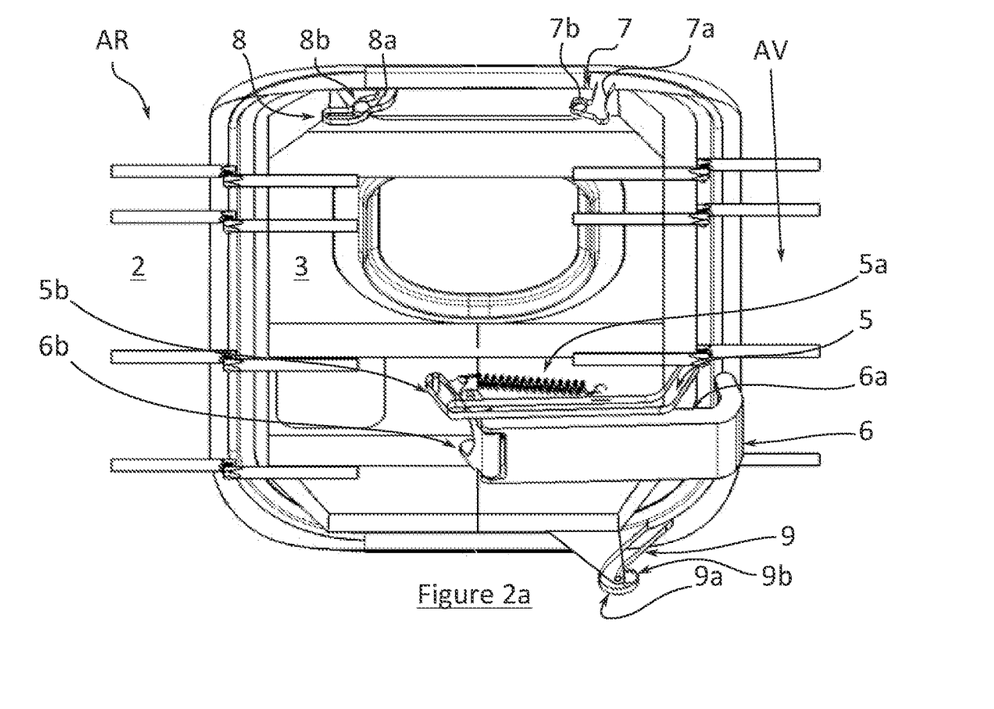
FIGS. 2a to 2d, a transparent view from above of the door in an opening movement according to the invention.

To start with, FIG. 2a shows the general operation of the opening. The door opening control ramp 7 guides the door 3 in positions of pushing towards the front AV and towards the rear AR of the aircraft 2. In addition, the springs 5a and 6a adapt the position of the arms 5 and 6 relative to the door 3 by extension or contraction of these springs 5a and 6a. The slides 8a and 9a respectively have an "S" shape and a "hairpin" shape.

Figure 2B:
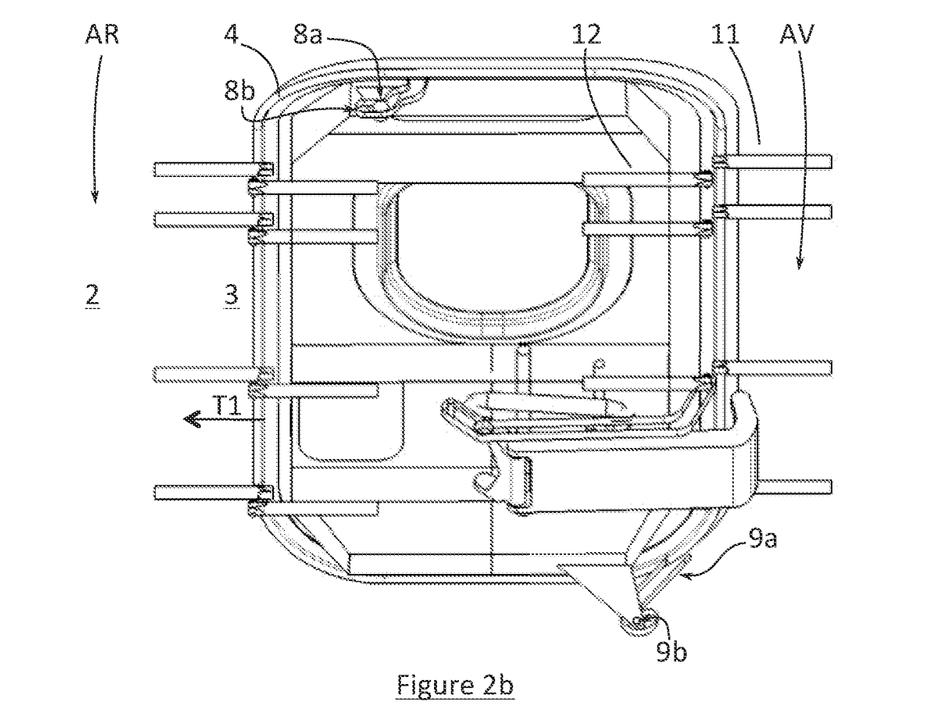

In FIG. 2b, it appears that this control ramp 7 generates a first displacement of the door towards the rear AR and towards the inside of the aircraft 2 which follows the shape of the curves of the slides 8a, 9a via the rollers 8b, 9b. A combination of movements of the front AV and rear AR parts of the door 3 by rotation and translation releases the door stops 12 from the stops 11 of the fuselage 23 and brings the door 3 in translation T1 towards the rear AR.

Figure 2C:
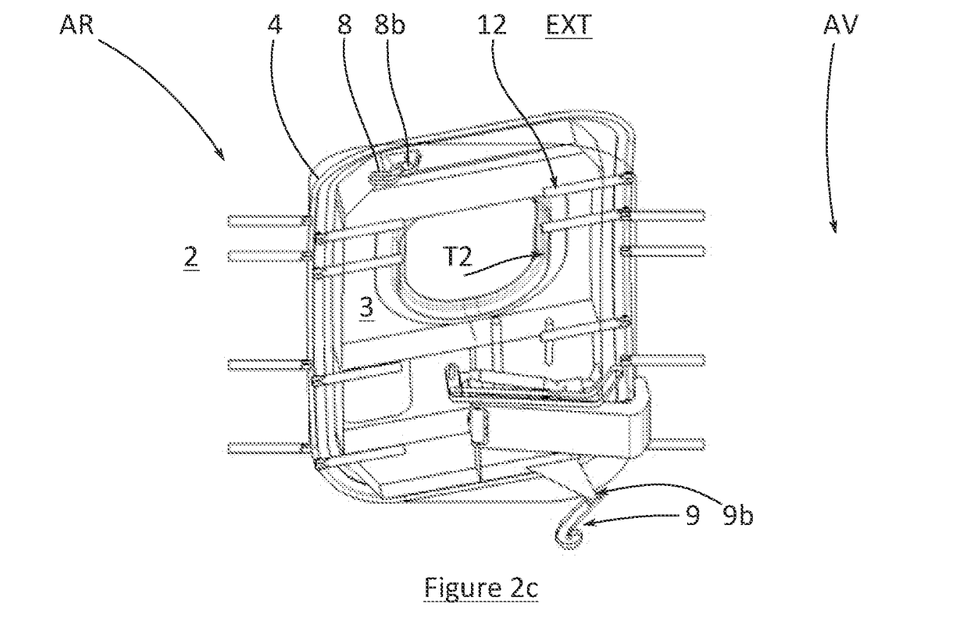

Then the opening of the door 3 continues, with reference to FIG. 2c, with control of movement of the door 3 towards the front AV, which causes its front part to rotate towards the outside EXT, imparted by the rollers 8b and 9b in the rear guide 8 and front guide 9, generally in an inclined translation T2. The front part of the door 3 and its front stops 12 are then released from the frame 4 to the outside EXT of the aircraft fuselage 2.

Figure 2D:
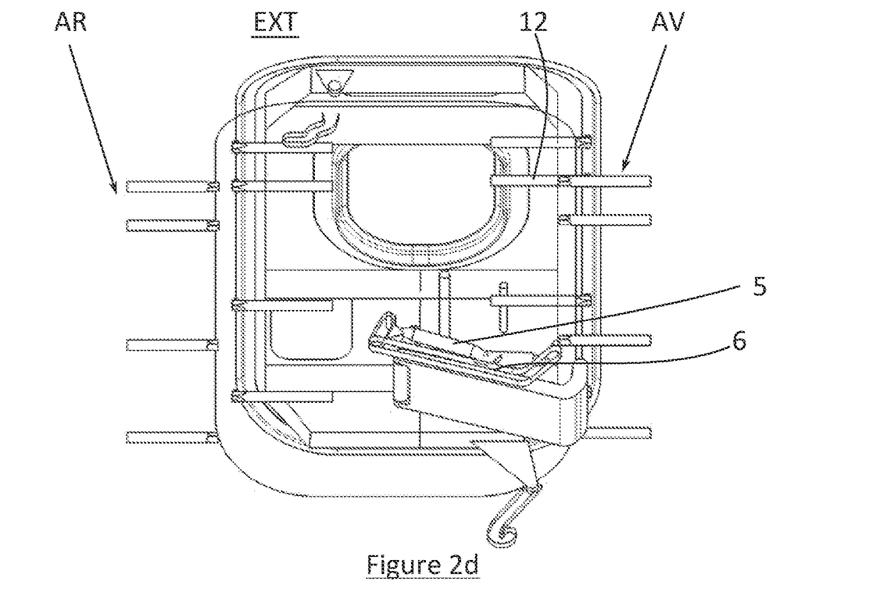

The kinematics continues, as illustrated in FIG. 2d, by the arms 5 and 6 which, in articulation with the forearms 5b, 6b towards the rear AR, give rise to a rotation of the rear part AR of the door 3 and towards the outside EXT, as well as initiation of translation of the door 3 towards the front AV parallel to the fuselage 2, the rear and front door stops 12 then being out of the frame 4. The rear roller 8b is out of its slide 8a and the front roller 9b remains in a position close to the outlet of the slide 9a.

Figure 3:
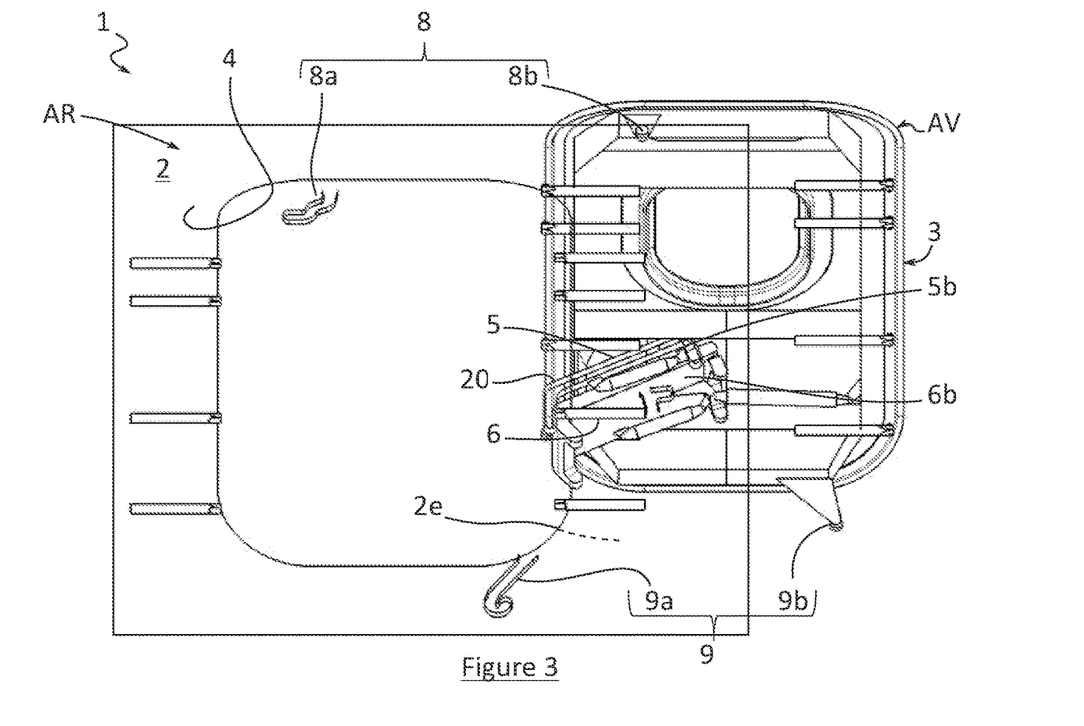
FIG. 3, a transparent perspective face-on view of the door in the open position.

FIG. 3, which shows a transparent, face-on view of the door 3 at the end of the opening movement, shows the completion of the rotation of the arms 5 and 6 around the articulated connection 20 on the front AV side of the frame 4. This rotation has driven the door 3 towards the front AV and towards the illustrated final open position, in which its inside face 3i is disposed facing the outside of the fuselage 2e.

In this final position, the springs 5a and 6a (see FIG. 1) keep the door 3 in a stable open position. The running rollers 8b and 9b, fixed on the door 3, are out of their slides 8a and 9a which remain fixed on the frame 4. The arms 5, 6 and forearms 5b, 6b are arranged against the door 3 without extension of the return springs, as in the initial reference position of the door 3 by the force generated by the return springs in extension.

Figure 4:
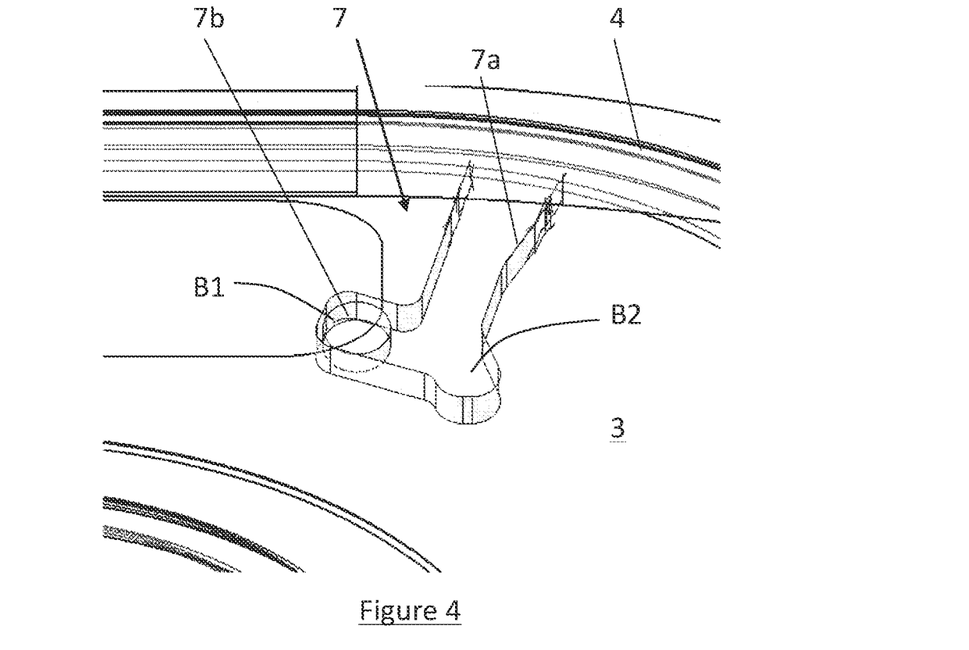
FIG. 4, a transparent view of the control ramp of the mechanism of FIG. 1.

FIG. 4 illustrates a transparent view of the control ramp 7 implemented in the example described above, comprising a slide 7a fixed on the frame 4, and a running roller 7b fixed on the door 3. This control 7 guides the opening/closing movement of the door 3 towards the front AV or towards the rear AR by moving the roller 7b into one or the other of the stop positions B1 and B2.

Figure 5:
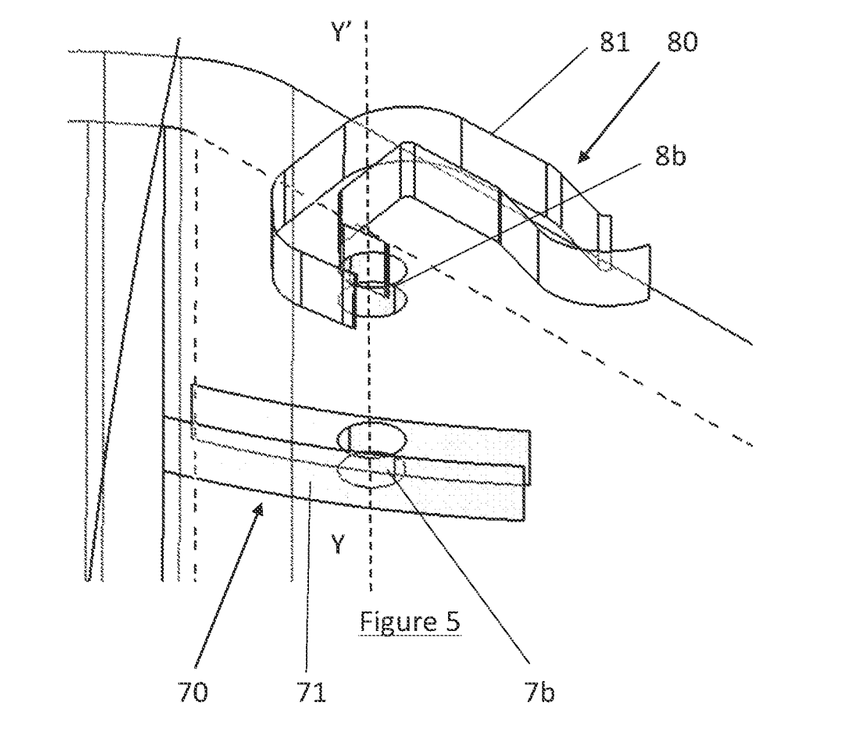
FIG. 5, a perspective view of a front guide and an alternative control ramp positioned at the level of the arm in another exemplary embodiment of the door opening/closing mechanism.

And FIG. 5 shows in transparency a perspective view of the control ramp 70 and of the front guide 80 of another example of a door opening/closing mechanism according to the invention. In this example, the "C"-shaped front guide 80 and the control ramp 70 are positioned between a handling arm 5 and the door 3 (see FIG. 1). The slides 71 and 81 of the ramp 70 and of the front guide 80 are mounted on the arm 5, while the rollers 7b and 8b are fixed co-axially on the door 3 along an axis Y'Y. This example therefore makes it possible to simplify the coordination between the control ramp 70 and the front guide 80, and to dispense with the presence of springs.

FIGS. 6a to 6d show more precisely, in transparent and schematic views from above, the opening kinematics of the door 3 implemented by the opening mechanism incorporating the control ramp 70 and the front guide 80 of FIG. 5. Each of these FIGS. 6a to 6d schematically shows the two arms 5 and 6, their two forearms 5b and 6b, as well as the slide 81 associated with the running roller 8b of the front guide 80.

FIG. 6a to FIG. 6d show that the kinematics of opening the door 3 is controlled by the "C" shape of the slide 81 integral with the arm 5, while the roller 8b moves from one end 8c to the other 8d in the slide 81.

In the door closed position (FIG. 6a), the roller 8b is at the end 8c of the slide 81, the arms 5, 6 and their forearms 5a, 6a are in the reference position.

Figure 6A:
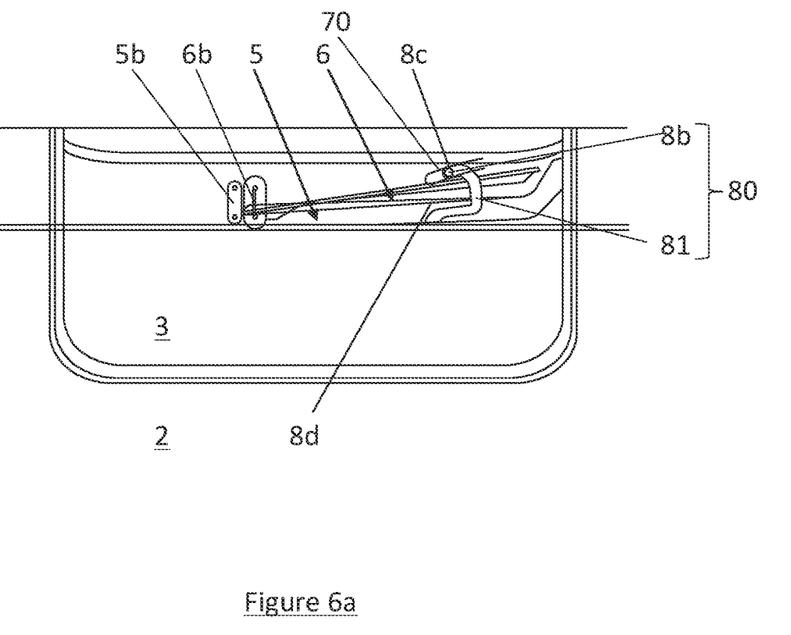
FIGS. 6a to 6d, a transparent schematic view from above of the kinematics of the door in the opening movement in the other exemplary embodiment.
Figure 6B:
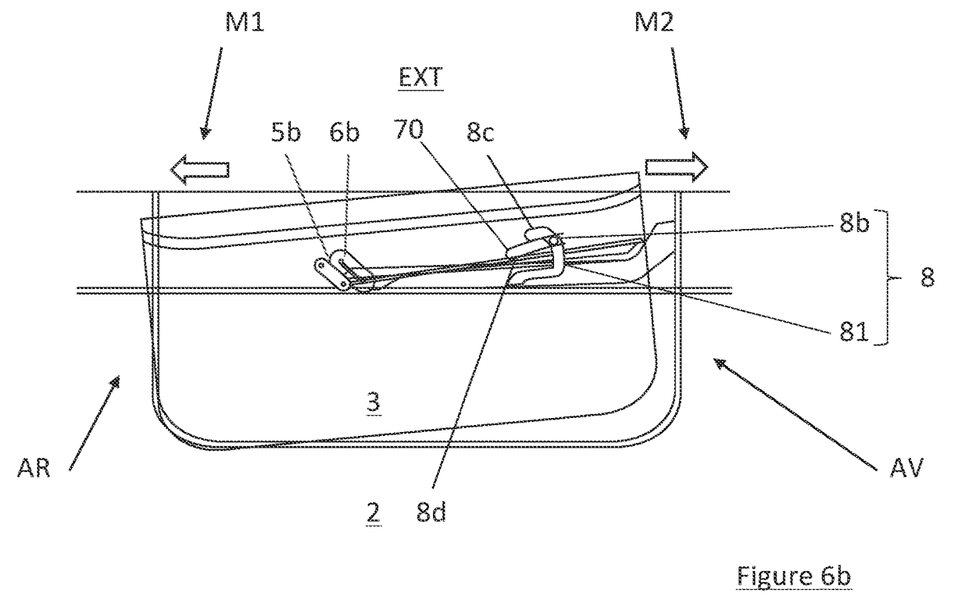
Figure 6C:
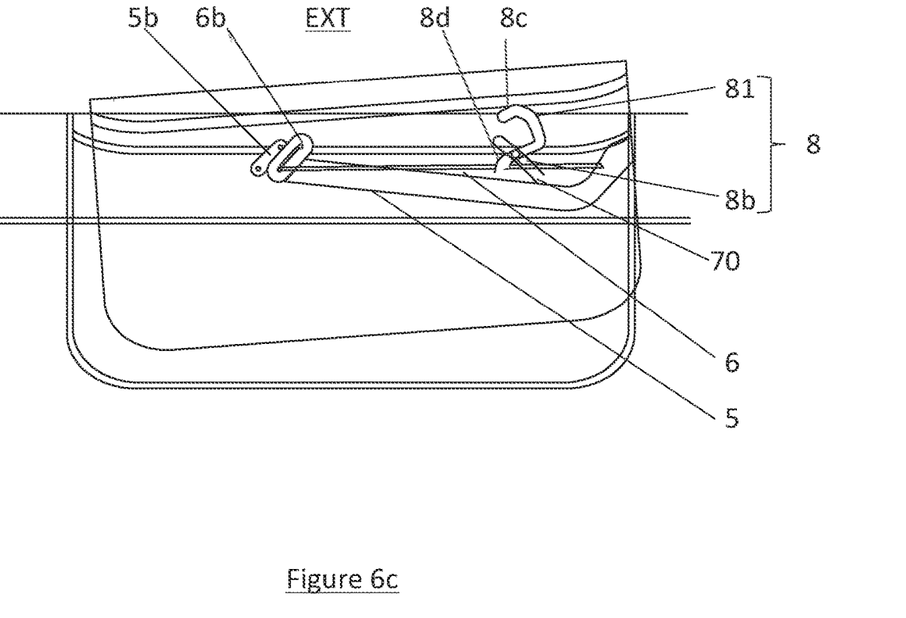

In FIGS. 6b and 6c, the roller 8b is in intermediate positions between the ends 8c and 8d of the slide 81. The door 3 tilts in rotation so that the front part moves towards the front AV and the outside EXT of the fuselage 2 to the rear of the door 3 and towards the rear AR according to the movement M1 to release the door stops 12 from the frame stops 11 (see FIG. 1), and according to a movement M2 while continuing to tilt in rotation. The forearms 5b, 6b pass from a position tilted towards the front AV (FIG. 6b) to a position tilted towards the rear AR (FIG. 6c), by their articulation on the corresponding arms 5, 6 via the return springs 5a, 6a (see FIG. 1).

Figure 6D:
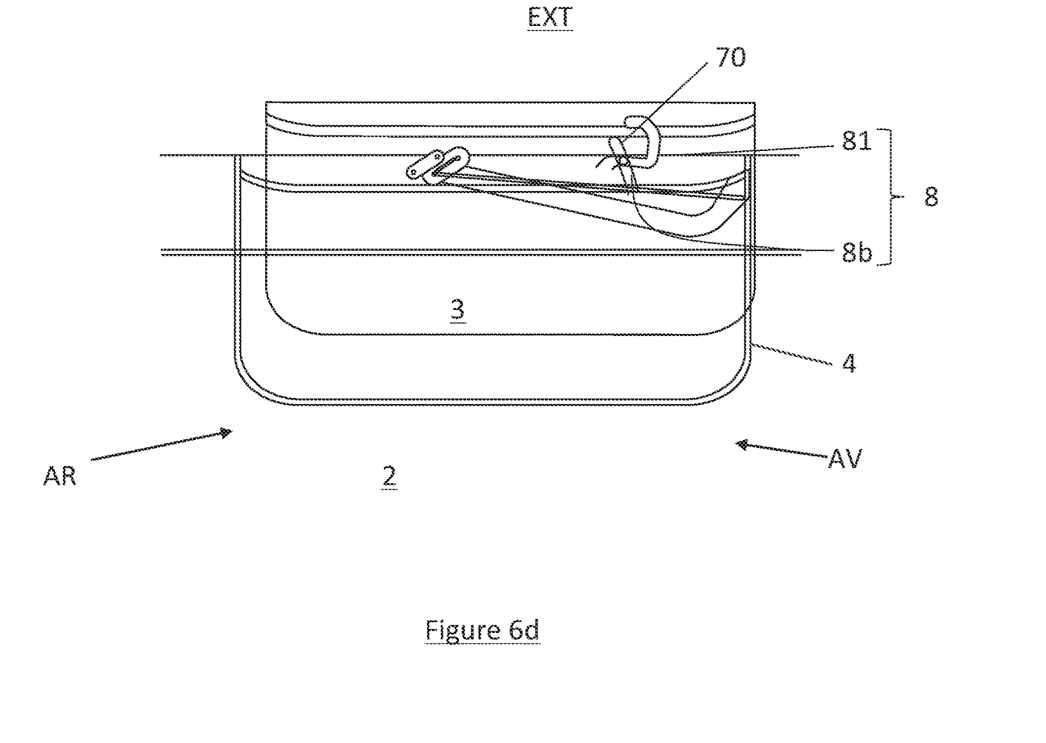

In FIG. 6d, the roller 81 arrives at the end position 8d of the slide 81 and the door 3 has tilted in reverse rotation with respect to that of FIG. 6a, so that the rear part of the door 3 also advances towards the outside EXT of the fuselage 2: the door 3 is then out of its frame 4, parallel to the fuselage 2. The final phase of opening the door 3 is identical to that of the previous example as illustrated in FIG. 3.

The invention is not limited to the exemplary embodiments described and depicted. Thus, the arms can be moved by an electric control. The position of the guides is not fixed.

Independently of one another, the slides can be placed on the frame in high or low, front or rear positions, or out of the frame at the level of the front arm for one of the two slides. Likewise, the position of the control ramp can be arranged in a high or low, front or rear position, or even at the level of the arm.

Furthermore, the slides can be fixed on the door and the running rollers on the fuselage.

The invention claimed is:

1. A method for opening/closing a door (3) arranged in an opening of a fuselage of an aircraft (1), the opening being defined by a frame structure (4), the door (3) comprising an inside face (3i), a front part (AV), and a rear (AR) part defined with respect to a longitudinal axis (X'X) of the aircraft (1), the door (3) and the frame (4) of the aircraft (1) comprising front and rear positioning stops for positioning the door (3) in the frame (4), the kinematics of the movements of the door (3) relative to the fuselage (2) taking place from the frame (4) in a main horizontal plane (P) of the aircraft (1) by at least one manipulation arm (5, 6) coupled to an articulation forearm (5b, 6b) on the door (3) and being piloted, reversibly, by a slide front guide (9) and a slide rear guide (8) between a closed position in abutment in the frame (4) and an open position outside the frame (4) on the inside face of the door (3) against the fuselage (2), the method comprising the following steps for opening the door (3):
   guiding a slide control element (7) for opening the door (3) to positions towards the front part (AV) and towards the rear part (AR) of the aircraft (1);
   generating a first movement of the door (3) by the slide control element (7) towards the rear part (AR), and towards the interior of the aircraft (1) by a combination of the slide front guide (9) and the slide rear guide (8) of the front part (AV) and the rear (AR) part of the door (3) respectively in rotation and in translation, which releases stops (12) of the door (3) from stops (11) of the fuselage (2);
   moving the door (3) by rotation about the slide rear guide (8) and inclined translation towards the front part (AV) and the outside (EXT) of the aircraft (1) along the slide front guide (9), the front part (AV) of the door (3) and the front stops (12) then disengaging from the frame (4) towards the outside (EXT) of the aircraft (1); and
   articulating the manipulation arm (5, 6) in rotation about an articulated link (20) on the front part (AV) of the frame (4) in order to move the door (3) towards the front part (AV) of the aircraft (1), the movement ending outside the frame (4) with the inside face (3i) of the door (3) against the fuselage (2).

2. The opening/closing method as claimed in claim 1, wherein in the closing mode, the successive steps of the opening mode are linked together in reverse kinematics.

3. The opening/closing method as claimed in claim 1, wherein return devices (5a, 6a) maintain a position of the forearm (5b, 6b) relative to the manipulation arm (5, 6) by extension of the return devices (5a, 6a) to generate a rotational movement of the rear part (AR) of the door (3) as well as a translation of the door (3) towards the front part (AV) of the aircraft (1) parallel to the fuselage (2).

4. An aircraft (1) comprising:
   at least one door (3) equipped with an opening/closing mechanism for implementing the method as claimed in claim 1, wherein the movement of the door (3) in a main horizontal plane (P) of the aircraft (1) is controlled by coupling between the door (3) and the frame (4) on the slide control element (7) and the slide front guide (9) and the slide rear guide (8), the front part (AV) and the rear part (AR) are arranged between the door (3), and the frame (4) is coupled to the at least one manipulation arm (5, 6) articulated in rotation on the front part (AV) of the frame (4) and to the door (3) via the forearm (5b, 6b).

5. The aircraft as claimed in claim 4, wherein the slide control element (7) and the slide front guide (9) and the slide rear guide (8) each comprise a slide (7a, 8a, 9a) associated with a circulation roller (7b, 8b, 9b) in the slide (7a, 8a, 9a), the slides (8a, 9a) of the slide guides (8, 9) being open at one end (8c, 9c).

6. The aircraft (1) as claimed in claim 5, wherein the slides (7a, 8a, 9a) are fixed to the frame (4) and the rollers (7b, 8b, 9b) are integral with the door (3).

7. The aircraft (1) as claimed in claim 5, wherein the slides (7a, 8a, 9a) are fixed to the door (3), and the rollers (7b, 8b, 9b) are integral with the frame (4).

8. The aircraft (1) as claimed in claim 4, wherein the control ramp (7) is arranged in the front part (AV) and upper part of the door (3), and the front part (AV) and the rear part (AR) and the slide guides (8, 9) are respectively arranged in the lower front part of the door and in the upper rear part of the door (3).

9. The aircraft as claimed in claim 4, wherein return devices (5a, 6a) are located between the manipulation arm (5, 6) and the forearm (5b, 6b) to extend the position of the forearm (5b, 6b) relative to the manipulation arm (5, 6).

10. The aircraft (1) as claimed in claim 4, wherein the slide control element (7) and one of the guides (80) are arranged between the manipulation arm (5, 6) and the door (3).

11. The aircraft (1) as claimed in claim 10, wherein rollers (7b, 8b) are aligned on one and the same axis (Y'Y) that is integral with the manipulation arm (5, 6).

12. The aircraft (1) as claimed in claim 4, wherein the each manipulation arm (5,6) is coupled to the corresponding forearm arm (5b, 6b).

* * * * *